July 24, 1962    T. L. SEABORNE    3,045,493
MILK MEASURING AND SAMPLING DEVICE FOR MILKING MACHINES
Filed July 21, 1959
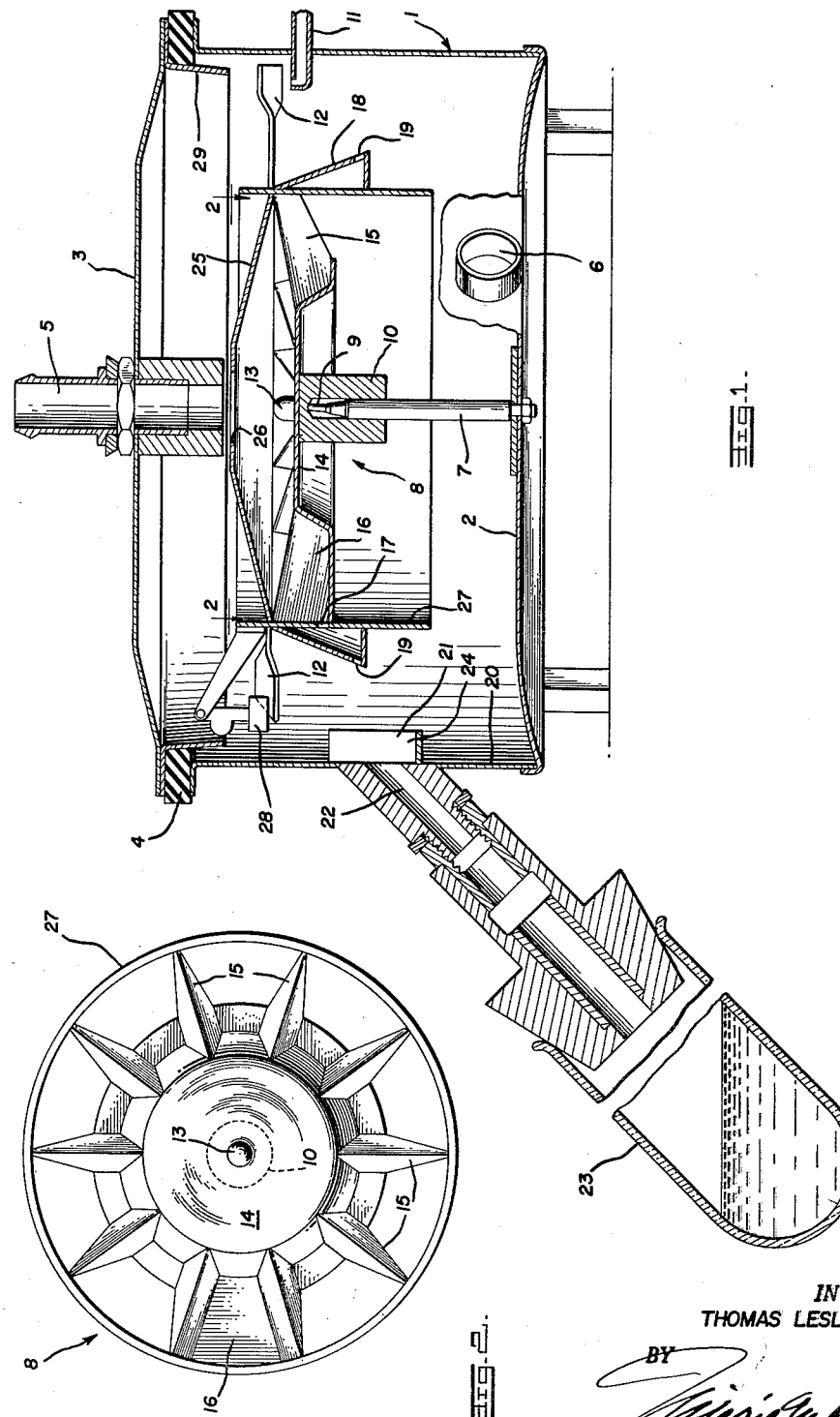
INVENTOR.
THOMAS LESLIE SEABORNE

United States Patent Office 3,045,493
Patented July 24, 1962

3,045,493
MILK MEASURING AND SAMPLING DEVICE FOR MILKING MACHINES
Thomas Leslie Seaborne, Corner of Lygon St. and Brunswick Road, East Brunswick, Victoria, Australia
Filed July 21, 1959, Ser. No. 828,580
7 Claims. (Cl. 73—424)

This invention relates to an improved device for measuring and sampling milk passing from the teat cups of a milking machine, and is particularly intended for giving an accurate indication of the production of individual cows at any one milking and also collecting a representative milk sample for testing for butter fat content or other purposes.

Existing milk meters or measuring devices have not proved very reliable in use. Changes or fluctuations in the rate of milking have been found to adversely affect the operation of the devices so that measuring is not accurate and they are also generally of cumbersome construction not suited to the hygienic requirements of modern machine milking.

The present invention has for its object to provide a milk measuring and sampling device which overcomes the above difficulties and gives accurate results under all normal milking conditions irrespective of fluctuations in the milking rate.

According to the invention, the improved device is characterized by having means for distributing milk centrifugally onto the wall of a vessel so as to form a descending curtain or film of milk of uniform thickness on said wall, and means on said wall for intercepting and collecting a predetermined fractional portion of the milk so distributed for measuring or testing purposes.

Preferably, the milk centrifugally distributed onto the wall is only a predetermined fraction of the total quantity of milk fed to the device.

The invention is more fully described aided by reference to the accompanying drawings wherein:

FIG. 1 is a vertical section view of a representative construction of the device according to the invention.

FIG. 2 is a section plan view taken substantially on line 2—2 of FIG. 1.

As is shown in these views, the device comprises a cylindrical pot-like vessel 1 having a closed bottom 2 and a top which is normally closed by a lid 3 seating on a rubber or like gasket 4. The lid has a central inlet 5 through which the milk is supplied to the device from the milking machine teat cups and the bottom 2 has an outlet 6 through which the milk passes from the device.

Secured to the bottom 2 is a central spindle 7 supporting a rotor 8. Preferably the upper end of the spindle is pointed as at 9 and the rotor has a central recessed hub 10 receiving said pointed end to form a low friction bearing for the rotation of the rotor. The rotor is driven by means of a jet of air from any suitable source applied through a nozzle 11 in the side of the vessel 1 to impinge upon a bladed turbine member 12 secured to the rotor.

The rotor has a central boss 13 onto which the milk is initially directed from the inlet 5. Surrounding said boss is an annular floor 14 which at its outer edge or periphery carries a plurality of equidistantly spaced vanes 15. The spaces between said vanes are open with the exception of one space between two adjacent vanes which is closed to form a small trough 16. Thus, the milk passing to the vanes 15 falls through to the bottom 2 with the exception of the small amount collected in the trough 16.

The trough 16 has an outlet 17 communicating with an outwardly sloping gallery 18 on the outside of the rotor and said gallery has a plurality of small holes 19 from which the milk is centrifugally distributed in the form of small droplets onto the inner face of the side wall 20 of the vessel 1. Arranged in said side wall 20 is a collecting cup 21 having a downwardly sloping outlet 22 leading to a detachable sample collecting flask or bottle 23. The collecting cup 21 has side walls 24 which sharply define the dimensions of the cup and its capacity for collecting a portion of the milk distributed onto the wall 20.

In operation, the rotor is driven at relatively high speed by the air jet from the nozzle 11 and the milk from the milking machine teat cups is fed into the device through the inlet 5 and caused to fall onto the central boss 13 of the rotating rotor. Said boss functions to initially divide the entering milk stream which becomes uniformly distributed over the annular floor 14 as it spreads outwardly to the periphery of said floor under the action of centrifugal force. The bulk of the milk simply passes through the spaces between the vanes 15 and gravitates to the bottom 2 of the vessel 1 from which it passes to the outlet 6. A predetermined fraction of the milk is, however, collected in the trough 16 and this quantity of milk is truly proportional to the total quantity of milk fed to the rotor depending, of course, on the size of the trough in relation to the periphery of the floor 14. Thus, if for instance, there are ten equidistantly spaced vanes 15 on the periphery of the floor 14 and nine of the spaces between said vanes are open while the remaining space is closed to form the trough 16, then nine-tenths of the total milk fed to the rotor passes through the spaces to the bottom 2 while the remaining one tenth is collected in the trough 16.

The quantity of milk collected in the trough 16 passes through the outlet 17 under centrifugal force to the gallery 18 and is centrifugally distributed through the holes 19 in said gallery in the form of shower of small droplets onto the inner face of the wall 20 and flows down the latter in the form of a curtain or film of uniform thickness. All of said milk with the exception of the fraction intercepted and collected by the cup 21 flows to the bottom 2 of the vessel 1. The small quantity of milk intercepted by the cup 21 flows down the sloping outlet 22 to the detachable sample flask or bottle 23. This quantity of milk is truly proportional to the quantity of milk centrifugally distributed from the trough 16 depending, of course, on the size of the space between the said walls 24 of the cup in relation to the periphery of the said wall 20. Thus, if the space between said side walls 24 is equal to one-tenth of the periphery of said wall 20, then the quantity of milk collected in the flask or bottle 23 is one-tenth of the milk passing through the trough 16 or one-hundredth of the total milk fed to the rotor.

The quantity of milk collected in the flask or bottle 23 is finally weighed and the total quantity of milk fed to the device is thus calculated therefrom. For instance, if the weight of the milk collected in the flask or bottle 23 is .2132 lb., then on the example given, the total weight of milk passed through the device is 21.32 lbs. The proportioning of the device to collect an one-hundredth part of the total milk is found most convenient as the total weight of milk is ascertained simply by moving the decimal point two places when the weight of the milk in the sample flask or bottle 23 is expressed as a decimal fraction.

The device will be found to be very accurate in use and, as milk is being collected in the flask or bottle 23 during the whole period the milk is entering the device, the collected sample is a truly representative one in regard to butter fat content and other components.

Various refinements may be made in the device. For instance, to prevent splashing of the milk while it is being fed onto the central boss 13 and floor 14, a splash plate 25 may be fitted to the rotor above the floor 14 and have a central aperture 26 through which the milk passes from the inlet 5. Likewise, to facilitate the downward flow of the milk passing through the spaces between the vanes 15 and prevent any possibility of such milk being projected onto the wall 20, a skirt 27 is preferably provided on the rotor and extends downwardly below the level of the collecting cup 21.

The side walls 24 of the collecting cup 21 can also, if desired, be tangentially arranged relatively to the gallery 18 so as to more efficiently intercept and collect the fractional quantity of milk centrifugally distributed from the holes 19 of the gallery.

To prevent excessive speed of the rotor 8, a weighted arm 28 may be pivoted to the turbine member 12 in such position that, when it swings outwardly under centrifugal force, it will contact a skirt 29 on the lid 3 and function as a friction brake.

What I claim is:

1. A milk measuring and sampling device for milking machines comprising a cylindrical pot-like vessel having a bottom and side wall, distributing means in said vessel for distributing centrifugally onto said side wall a predetermined fraction only of the total quantity of milk delivered thereto so as to form a descending curtain or film of milk of uniform thickness on said side wall, means for feeding the total quantity of milk onto said distributing means, and means on the side wall for intercepting and collecting a representative sample of the distributed milk proportional to the total quantity of milk distributed.

2. A milk measuring and sampling device as claimed in claim 1 wherein the distributing means comprises a rotor rotating within the vessel, means for driving the rotor, a trough on the rotor to collect said fraction of the total quantity of milk fed onto the rotor, and an outlet from the trough through which the milk collected in the latter passes for distribution centrifugally onto said side wall.

3. A milk measuring and sampling device for milking machines comprising a cylindrical pot-like vessel having a bottom and side walls, means in said vessel for distributing milk centrifugally onto said side wall so as to form a descending curtain or film of milk of uniform thickness, and means on the side wall for intercepting and collecting a representative sample of the distributed milk proportional to the total quantity of milk distributed, the means for distributing the milk comprising a rotor rotating within the vessel, means for driving the rotor, means for feeding the milk onto the rotor, a trough on the rotor to collect only a fraction of the total quantity of milk fed onto the rotor, and an outlet from the trough through which the milk collected in the latter passes for distribution centrifugally onto said side wall, said rotor having a central boss onto which the milk is initially directed, an annular floor surrounding the boss over which the milk initially divided by the boss is uniformly distributed as it spreads outwardly to the periphery of the floor under the action of centrifugal force, and a plurality of equidistantly spaced vanes at the periphery of the floor, the spaces between said vanes being open to allow the milk to fall to the vessel bottom with the exception of one space between two adjacent vanes which is closed to form the trough.

4. A device as claimed in claim 2 wherein a gallery is fixed to said rotor in communication with said trough, said gallery having an opening from which the milk from the trough is distributed centrifugally as the rotor and gallery rotate.

5. A milk measuring and sampling device as claimed in claim 2 wherein the means for driving the rotor comprises a bladed turbine member on the rotor and a nozzle from which a jet of air is directed to impinge upon and drive the turbine member.

6. A milk measuring and sampling device as claimed in claim 3 wherein a splash plate is fitted to the rotor above the annular floor and has a central aperture through which the milk passes to the central boss.

7. A measuring and sampling device for liquids, especially milk, comprising a hollow vessel having a liquid inlet in its upper portion and an outlet at its bottom portion, rotor means rotatably supported in said vessel, means for rotating said rotor means, said rotor means including a generally horizontal floor member and a generally cylindrical skirt projecting above and below said floor member with said skirt being arranged concentrically with relation to the rotational axis of said rotor means and with said liquid inlet, said floor member being divided into a plurality of equal-area liquiding-receiving regions, the majority of which are open to the bottom of said vessel inwardly of said skirt and at least one of which forms a trough with said skirt provided with a discharge passage extending to the outer side of said skirt, whereby the liquid intercepted by said trough, which represents a predetermined fraction of the total amount of liquid delivered through said inlet, is delivered against the inner surface of said vessel surrounding said rotor means while the majority of liquid delivered into said vessel flows axially through said rotor means to the bottom of the vessel, and means on said inner surface of the vessel for intercepting a predetermined portion only of the fraction of liquid delivered to such surface and for delivering such predetermined portion to a collection chamber for measurement and/or sampling.

References Cited in the file of this patent

UNITED STATES PATENTS

| | | |
|---|---|---|
| 608,834 | Byrnes | Aug. 9, 1898 |
| 655,478 | Damm | Aug. 7, 1900 |
| 1,121,246 | Hinman | Dec. 15, 1914 |
| 2,541,519 | Jones | Feb. 13, 1951 |